Patented Oct. 1, 1940

2,216,179

UNITED STATES PATENT OFFICE 2,216,179

PREPARATION OF PREGELATINIZED STARCHES

Hans F. Bauer, Chicago, Ill., assignor to Stein, Hall Manufacturing Company, Chicago, Ill., a corporation of Delaware No Drawing. Application January 15, 1937, Serial No. 120,688

8 Claims. (Cl. 127—32)

This invention relates to the preparation of products from starchy polysaccharides which disperse in water at ordinary temperatures and pressures. It relates more particularly to the preparation of pregelatinized starches, that is, starch products which are marketed in the dry state but are capable of being dispersed in water to form colloidal dispersions at ordinary temperatures without cooking or heating.

It is well known that in order to disperse starchy polysaccharides in water to obtain colloidal, clear or translucent dispersions it is necessary to heat or cook the starch suspensions until gelatinization occurs. This entails the expenditure of time and effort on the part of the user and adds to the consumer's cost in obtaining the starch in a dispersed form.

In order to prepare starches which disperse or swell in cold water, the usual practice is to apply the starch in an ungelatinized condition mixed with water to revolving hot rolls on which the starch is gelatinized and dried in the form of a thin film which is subsequently flaked off and ground to the desired degree of fineness. The final product is calculated to swell readily and disperse in cold water. This method of preparing pregelatinized starch is relatively expensive and the cost of such starch to the consumer is relatively high. It is very difficult, moreover, to grind the starch after it has been gelatinized and dried in this manner.

It is an object of the present invention to provide a new and improved method of producing starchy polysaccharides which are readily dispersible in cold water. A further object is to produce new and useful starchy polysaccharides at low cost. Another object is to provide a method of preparation which can be easily controlled to give a product of predetermined water-absorption characteristics. Other objects will appear hereinafter.

In accordance with the present invention it has been found that pregelatinized starchy polysaccharides may be obtained by adding to a given starchy polysaccharide a controlled amount of water and then subjecting the moistened starchy polysaccharide to controlled conditions of time and temperature without allowing substantial evaporation, and with or without the addition of auxiliary materials, as more fully hereinafter described.

According to one method of practicing the invention, a starchy polysaccharide in the normally air-dried state is premoistened in order to add more water than normally present, the added water being preferably about 15% to about 60%, based upon the weight of the starch. The premoistened starchy polysaccharide is then screened to break up any lumps and render it to a fluffy condition, after which it is subjected to the direct action of steam which gelatinizes the starch and gives a resultant crumbly gelatinous mass. After steaming, the gelatinous starch is dried somewhat, if necessary, and then passed into a suitable mill, e. g., a suitable hammer mill, heated with a current of warm air, and simultaneously ground and dried. The product may be separated into different particle sizes by any suitable kind of mechanical air separator or by any other suitable manner.

The products obtained from premoistened starchy polysaccarides without the addition of auxiliary materials have a relatively low absorption capacity, varying, for instance, from about one to about eight parts of water. Where it is desirable that the product take up more water, it has been found that the addition to the premoistened starch of a mildly alkaline reacting material, such as, for example, borax and/or tri-sodium phosphate, increases the water-absorptive capacity. The addition of an alkali such as borax, although desirable in order to increase the water-absorptive capacity, tends to produce a gummy mixture upon steaming which is not thoroughly suitable for grinding. In order to produce a more suitable product, it is desirable, in accordance with this invention, to add a water-absorptive filler, for example, a clay, to the premoistened blend prior to steaming or heating.

In practicing the invention an auxiliary gelatinizing agent, for example, a caustic alkali such as sodium hydroxide or potassium hydroxide, may be mixed with the starchy polysaccharides during or prior to steaming the product. Likewise urea, its analogues or homologues may be employed.

By controlling the amount of water employed to premoisten the starchy polysaccharide, the time of heating, the temperature and the auxiliary agents employed, practically any kind of pregelatinized starch can be obtained much more simply and less expensively than is possible by the hot roll method at present employed for producing pregelatinized starch.

The invention will be further illustrated, but is not limited, by the following examples.

*Example I*

To a normally air-dried powdered corn starch there was added 20% by weight of water. The resultant mixture was screened in order to make it fluffy and then steamed at a temperature of about 210° to 212° F. for 15 minutes, and subsequently dried and ground.

Another portion of the starch was premoistened by the addition of 50% water by weight, screened and steamed, and thereafter dried and ground.

Both products were cold water swelling starches having a relatively high water-absorptive capacity.

*Example II*

To 5 pounds of a dry blend containing 15% bentonite, 15% borax and 70% corn starch was added 20% water, based on the weight of the blend. The resultant mixture was then steamed for 15 minutes and thereafter introduced into a hammer mill where it was subjected to a current of air heated to a temperature of about 350° F. After passing through the mill the product had a moisture content of about 6.8% and readily dispersed in cold water.

*Example III*

A blend was prepared by mixing together 70 parts of rye flour, 15 parts of borax and 15 parts of bentonite, to which was added 20% water. The moistened mixture was steamed for 15 minutes then ground and dried. A pregelatinized starchy polysaccharide of excellent water-absorptive characteristics was thereby obtained.

*Example IV*

A blend was prepared by mixing together 5% urea, 10% borax and 85% corn starch. This blend was then moistened by adding thereto 40% of water, that is, 40 pounds of water per 100 pounds of blend. The mixture was steamed for 15 minutes and when removed from the steam was damp and gummy. It was air-dried for about 24 hours, broken into small lumps and ground. This product takes up about 3 parts of water per part of starch.

*Example V*

A blend was prepared from 5% urea, 5% sodium sulphate and 90% corn starch. To this blend was added 40% by weight of water. The resultant mixture was steamed for 15 minutes to obtain a product which was slightly damp but not gummy. This mixture did not require breaking into small lumps before grinding and required only a small amount of heat in order to dry it. It had a relatively low water-absorptive capacity which was increased by adding about 5% borax.

*Example VI*

To 100 parts of corn starch were added 40 parts of water. The premoistened corn starch was then steamed for 15 minutes at 210° to 212° F. and the product dried for one hour at 212° F. and ground. A pregelatinized starch having a relatively low water-absorptive capacity was obtained.

*Example VII*

A blend of 5% bentonite and 95% starch was moistened with 40% water and the resultant mixture steamed for 15 minutes. The product obtained was easily broken into small lumps without heating. It was dried and ground directly by passing it through a hammer mill and the resultant pregelatinized starch took up about 5 parts of water per part of starch.

*Example VIII*

A blend was prepared by mixing together 5 parts of borax, 10 parts of bentonite and 85 parts of starch. This blend was moistened with 40 parts of water and steamed for 15 minutes. The resultant product was easily broken into small lumps and ground in a hammer mill. The pregelatinized starch thus obtained was found to take up about 8 parts of water per part of starch.

*Example IX*

To 100 parts of corn starch were added 40 parts of water and about ¼% of 18° Bé. hydrochloric acid. A 4-pound batch was mixed for 30 minutes and then steamed for 15 minutes, dried and ground. The pregelatinized starch obtained was found to take up 2 parts of water per part of starch.

The following example illustrates the effect of varying the other ingredients while keeping the amount of water constant.

*Example X*

In this example the dry ingredients were blended together then moistened with water, the mixture steamed for 15 minutes, dried for 24 hours and then the small brittle lumps were ground. The resultant pregelatinized starch was added to cold water in each case in order to determine the absorptive capacity. The amounts of the ingredients are given in the following table, the dry ingredients being given in percentages of the dry bland and the water in percentages of the bland:

| Product | Corn starch | Bentonite | Borax | Water | Absorptive characteristics of product |
|---|---|---|---|---|---|
| A | 95 | 5 |  | 40 | 5 |
| B | 90 | 10 |  | 40 | 5 |
| C | 85 | 10 | 5 | 40 | 8 |
| D | 95 | 5 | 2 | 40 | 5 |
| E | 75 | 15 | 10 | 40 | 8–10 |

Product A swelled in cold water but tends to settle somewhat. Product B did not go into solution as well as A. Product C swelled in cold water and did not settle. Product D showed a slight tendency to settle. Product E had a higher absorptive capacity than the other products.

*Example XI*

A blend was prepared by mixing together 70% chlorinated starch, 15% borax and 15% bentonite. To this blend there was added 20% water and the resultant mixture steamed for 15 minutes. The product was dried and readily ground.

*Example XII*

A blend was prepared by mixing together 15% borax, 15% bentonite and 70% corn starch. From this blend a mixture was prepared containing ½% pure calcium hypochlorite having 60% to 65% available chlorine and 20% water was added. This mixture was steamed for 15 minutes and the product dried and ground to produce a pregelatinized starch having a water-absorptive capacity of about 5.

By carrying out this method in a similar manner, but with the addition of 2.5% calcium hypochlorite instead of 0.5%, a pregelatinized starch was obtained having a water-absorptive capacity of about 3.

The following example will illustrate the effect of the amount of water upon the gelatinization of starch.

Example XIII

In this example a blend was prepared by mixing together 15% borax, 15% bentonite and 70% corn starch. This blend was then divided into 6 parts, moistened with varying percentages of water, steamed for 15 minutes, dried and ground. The results are illustrated in the following table, in which the second column gives the percentage of water in the mixture prior to steaming and the last column gives the water-absorptive capacity in parts of water per part of pregelatinized starch.

| Product | Percent water | Water-absorptive capacity |
|---|---|---|
| A | 10 | 10 |
| B | 20 | 10 |
| C | 30 | 15 |
| D | 40 | 15 |
| E | 50 | 20 |
| F | 60 | 20 |

The following example illustrates the effect of formaldehyde on the pregelatinized product.

Example XIV

A number of pregelatinized starches were made by adding formaldehyde to corn starch, premoistening with water, steaming with saturated steam under ordinary pressure for fifteen minutes and simultaneously grinding and drying the product. The resultant pregelatinized starch was added to cold water in each case in order to determine the absorptive capacity. The amounts of the ingredients are given in the following table in part by weight:

| Product | Corn starch | Formaldehyde | Water | Absorptive capacity |
|---|---|---|---|---|
| | Percent | | | |
| A | 100 | 1 | 40 | 5 |
| B | 100 | 3 | 40 | 8 |
| C | 100 | 5 | 40 | 10 |

It will be understood that the conditions may be varied depending upon the type of pregelatinized starch desired, and particularly upon the desired water-absorptive capacity. Ordinary starch contains about 15% moisture and not more than 20% moisture in its normal air-dried condition. It is preferable, in accordance with the present invention to premoisten the starch in order to produce a starch having a total moisture content within the range of about 30% to about 70% water.

The temperature and duration of steaming may vary. In general, substantially saturated steam under atmospheric pressure conditions is suitable for the purpose of the invention. The time of steaming the premoistened starch should be such as to insure at least partial gelatinization. In general, the longer the steaming, the greater the water absorption or viscosity of the final product.

Any convenient method may be used other than screening in order to break up the starch and render it to a suitable condition so that it may be uniformly steamed.

In drying and grinding the product any suitable means may be employed, as, for example, a hammer mill such as is used for grinding soft materials to medium fineness. This is preferably used in conjunction with an air heater and blower which forces hot air through the mill and dries the particles while they are being ground. A cyclone or air separator is used to separate the ground dried material from the air stream.

In carrying out the invention any type of starchy polysaccharide may be employed, as, for example, wheat, rye, barley, oat, rice, corn, potato, sago and cassava starches and flours. Where a flour is used it may be desirable to pretreat the same with a gel-inhibiting agent such as sodium bisulfite as described, for instance, in my United States Patent No. 1,969,347. Thin boiling starches may be used.

It will be understood that instead of borax or tri-sodium phosphate other alkaline salts may be employed. Likewise, other alkali metals or alkaline earth metal hydroxides may be employed instead of sodium hydroxide.

Instead of bentonite, fuller's earth or other clays or water-absorptive fillers may be employed, preferably in sufficient amount to prevent or to decrease the gummy formation caused by the alkaline reaction materials such as borax. For this purpose it has been found that approximately equal amounts of bentonite and borax will produce very good results.

Pregelatinized starchy polysaccharides thus obtained may be used for purposes to which said products have previously been applied, in adhesives, as carriers for other products, for example, starch or starch mixtures with formaldehyde, caustic alkalis and/or borax, in the sizing of paper and paper board and in impregnating, sizing, coating, filling and gluing fibrous sheet materials, for example, paper, paper board, cloth and similar materials.

This invention provides a direct, inexpensive method of preparing pregelatinized starches. High steam pressures, such as are necessary in hot roll methods of preparing pregelatinized starch, are unnecessary in the practice of the present invention. Furthermore, the production capacity may be much higher by the present method than is possible according to existing hot roll methods. Ordinarily, if a starchy polysaccharide is merely premoistened and then dried the desired result cannot be obtained because the moisture escapes before any substantial gelatinizing or bursting of the starch granules occurs. By utilizing the direct action of steam in accordance with this invention this loss of moisture is prevented. Furthermore, steam penetrates the moistened particles more quickly than the usual methods of heat transfer from a metal roll. When a starchy material is heated in layers either between rolls or otherwise, the gelatinization of the surface forms an insulating layer which tends to decrease the penetration of the heat and prevent uniform gelatinization. With the present method this does not occur and uniformity of product is insured. Under the preferred conditions employed in accordance with this invention, the starch may be premoistened, steamed, and simultaneously dried and ground by a continuous or uninterrupted series of steps.

Having thus described the invention, what I claim as new and desire to secure by Letters Patent of the United States is:

1. In a method of producing a pregelatinized starchy polysaccharide, the step which comprises adding to a normally air-dried starchy polysaccharide about 15% to about 60% moisture, and steaming the premoistened starchy polysaccharide at substantially atmospheric pressure until partial bursting of the starch occurs, and subsequently drying and grinding simultaneously the thus prepared product while still in a moist state.

2. A method of producing a pregelatinized starchy polysaccharide which comprises adding to a normally air-dried starchy polysaccharide about 15% to about 60% moisture, steaming the premoistened starchy polysaccharide, and passing the aforesaid moist product through a hammer mill while simultaneously passing therethrough a heated current of air so as to produce a dried powdered product.

3. A method of producing a finely divided, dry gelatinized starch which comprises adding to a normally air dried starch an amount of moisture sufficient to render the moisture content thereof between 45% and 70%, modifying the premoistened starch by steaming and subsequently simultaneously drying and grinding the aforesaid moist product.

4. A method of producing a pregelatinized starchy polysaccharide which comprises adding to a starchy polysaccharide moisture sufficient in amount to at least partially gelatinize the starch upon heating in the presence of steam but insufficient to bring the starch to a state of fluidity, steaming the starchy polysaccharide so moistened, and simultaneously drying and grinding the thus prepared product while still in a moist state.

5. A method of producing a pregelatinized starchy polysaccharide which comprises adding to a starchy polysaccharide moisture and a water absorptive capacity modifying agent for the starch, the amount of moisture being at least sufficient to cause partial gelatinization of the starchy polysaccharide when it is heated with steam but insufficient to cause the starchy polysaccharide to assume a fluid state, steaming the premoistened material until partial bursting of the starch occurs, and simultaneously drying and grinding the thus prepared product while it is still in a moist state.

6. A method of producing a pregelatinized starchy polysaccharide which comprises adding to a starchy polysaccharide moisture and an alkaline modifying agent for the starch, the amount of moisture being at least sufficient to cause pregelatinization of the starchy polysaccharide when it is heated with steam but insufficient to cause the starchy polysaccharide to assume a relatively fluid state, the amount of alkaline modifying agent being sufficient to modify the water absorptive capacity of the starch when heated with steam, steaming the premoistened material containing said modifying agent until partial bursting of the starch and modification of the water absorptive capacity occur, and simultaneously drying and grinding the thus prepared product while it is still in a moist state.

7. A method of producing a pregelatinized starchy polysaccharide which comprises adding to a starchy polysaccharide moisture and an acidic modifying agent for the starch, the amount of moisture being at least sufficient to cause partial gelatinization of the starchy poysaccharide when it is heated with steam but insufficient to cause the starchy polysaccharide to assume a fluid state and the amount of acidic modifying agent being sufficient to cause the water absorptive capacity of the starch to be modified when heated with steam, steaming the premoistened material until partial bursting of the starch occurs, and simultaneously drying and grinding the thus prepared product while it is still in a moist state.

8. A method of producing a pregelatinized modified starchy polysaccharide which comprises adding to a starchy polysaccharide moisture and urea, the amount of moisture being at least sufficient to cause partial gelatinization of the starchy polysaccharide when it is heated with steam but insufficient to cause the starchy polysaccharide to assume a fluid state, and the amount of urea being sufficient to modify the water absorptive capacity of the starchy polysaccharide when heated with steam, steaming the premoistened material until partial bursting of the starch occurs and until the water absorptive capacity is modified, and simultaneously drying and grinding the thus prepared product while it is still in a moist state.

HANS F. BAUER.

CERTIFICATE OF CORRECTION.

Patent No. 2,216,179. October 1, 1940.

HANS F. BAUER.

It is hereby certified that error appears in the printed specification of the above numbered patent requiring correction as follows: Page 2, second column, lines 34 and 35, for the word "blind" read --blend--; and that the said Letters Patent should be read with this correction therein that the same may conform to the record of the case in the Patent Office.

Signed and sealed this 12th day of November, A. D. 1940.

(Seal)

Henry Van Arsdale,
Acting Commissioner of Patents.